United States Patent Office 3,146,250
Patented Aug. 25, 1964

3,146,250
NITROGEN-CONTAINING CYCLIC SILANES,
THEIR PREPARATION AND HYDROLYSIS
John L. Speier, Midland, Mich., assignor to Dow
Corning Corporation, Midland, Mich., a corporation of Michigan
No Drawing. Filed Oct. 11, 1961, Ser. No. 144,297
19 Claims. (Cl. 260—448.2)

This invention relates to new and useful nitrogen-containing cylic silanes, methods for their preparation and methods for making nitrogen-containing siloxanes from these compounds.

It is an object of the present invention to prepare novel nitrogen-containing cyclic silanes. Another object is to prepare siloxanes from these silanes. It is a further object to use these cyclic silanes to endblock diorganosiloxanes.

The novel nitrogen-containing cyclic silanes of this invention have the general formula

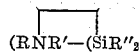

wherein R is selected from the group consisting of hydrogen atoms, monovalent hydrocarbon, monovalent hydrocarbon radicals containing oxygen in the form of

linkages, aminoalkyl, aminophenyl, halogenophenyl and organosilyl radicals of the general formula (XR—)Y₂Si— wherein Y is a monovalent hydrocarbon radical and X is selected from the group consisting of halogen atoms having an atomic weight of at least 35 and hydrogen atoms, R' is a divalent saturated aliphatic hydrocarbon radical wherein the silicon atom is attached to a carbon atom which is at least the third and not more than the sixth carbon atom away from the other substituent attached to R' and R" is selected from the group consisting of monovalent hydrocarbon, monovalent hydrocarbon radicals containing oxygen in the form of

linkages, alkoxy, alkoxy radicals containing oxygen in the form of

linkages and phenoxy radicals.

R in the above formula can be a hydrogen atom. R can also be a monovalent hydrocarbon radical. Specific examples of such radicals are alkyl radicals, such as methyl, ethyl, t-butyl and octadecyl; alkenyl radicals, such as vinyl, allyl and butadienyl; cycloalkyl radicals, such as cyclobutyl, cyclopentyl, cyclohexyl; cycloalkenyl radicals, such as cyclopentenyl and cyclohexenyl; aryl radicals, such as phenyl and xenyl; aralkyl radicals, such as benzyl and xylyl and alkaryl radicals, such as tolyl. R can be a monovalent hydrocarbon radical containing oxygen in the form of

linkages. Specific examples of such radicals are

CH₃CH₂OCH₂—, CH₃CH₂OCH₂CH₂— and CH₃OC₆H₄—. R can be an aminoalkyl radical such as aminomethyl, aminoethyl, aminohexyl and aminooctyl. R can also be an aminophenyl radical. R can be a halogenophenyl, such as p-ClC₆H₄— and m-BrC₆H₄—. R can also be an organosilyl radical of the formula (XR'—)Y₂Si— wherein Y is a monovalent hydrocarbon radical (suitable examples have been set forth previously) and X is a hydrogen or a halogen atom having an atomic weight of at least 35 (i.e. chlorine, bromine and iodine). R' in the XR' group is a divalent saturated aliphatic hydrocarbon radical wherein the silicon atom is attached to a carbon atom which is at least the third and not more than the sixth carbon atom away from the X group attached to R'. Thus, the XR'— group can be an alkyl radical such as CH₃CH₂CH₂—, CH₃(CH₂)₂CH₂—, CH₃(CH₂)₃CH₂— and CH₃(CH₂)₄CH₂—; a branched alkyl radical such as CH₃CH(CH₃)CH₂—; halogenoalkyl radicals, such as ClCH₂CH₂CH₂—, BrCH₂CH₂CH₂—, ICH₂CH₂CH₂—, ClCH₂(CH₂)₂CH₂—, ClCH₂(CH₂)₃CH₂— and ClCH₂(CH₂)₄CH₂—; or a branched halogenoalkyl radical, such as ClCH₂CH(CH₃)CH₂—. As indicated above, there must be in the R' group at least 3 and not more than 6 carbon atoms between the silicon atom and X.

R' in the

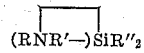

is a divalent saturated aliphatic hydrocarbon radical wherein the nitrogen atom is attached to a carbon atom which is at least the third and not more than the sixth carbon atom away from the silicon atom. Suitable examples of R' are —CH₂CH₂CH₂—, —CH₂(CH₂)₂CH₂—, —CH₂(CH₂)₃CH₂— and CH₂(CH₂)₄CH₂—. The R' group can also be a branched alkylene group as long as there are at least 3 and not more than 6 carbon atoms between the silicon atom and the nitrogen atom. Suitable examples of such branched alkylene groups are

—CH₂CH(CH₃)CH₂—, —CH₂CH(CH₂CH₃)CH₂CH₂— and —CH₂CH[(CH₂)CH₃]CH₂CH₂CH₂—. R" can be a monovalent hydrocarbon (suitable examples are set forth above); monovalent hydrocarbon radicals containing oxygen in the form of

linkages (suitable examples are set forth above); alkoxy radical, such as methoxy, ethoxy and butoxy; alkoxy radicals containing oxygen in the form of

linkages, such as

—OCH₂CH₂OCH₃, —OCH₂CH₂CH₂OCH₂CH₃ and —OCH₂OCH₂CH₃; or a phenoxy radical.

There are several methods for preparing the above cyclic silanes. Those cyclic silanes which contain no (XR'—)Y₂Si— radicals can be prepared by effecting a reaction between (1) a halogenoalkylhalogenosilane of the formula

and (2) an amino compound of the formula RNH₂. R' is a divalent saturated aliphatic hydrocarbon radical wherein the silicon atom is attached to a carbon atom which is at least the third and not more than the sixth carbon atom away from the other substituent attached to R'. R is a monovalent hydrocarbon, monovalent hydrocarbon radical containing oxygen in the form of

linkages, aminoalkyl, aminophenyl or halogenophenyl radical. Suitable examples of these radicals are set forth above. R" is as defined above. X can be a chlorine, bromine or iodine atom.

After the reaction has been concluded, the hydrogen halide produced is removed and the resultant product is separated by distillation or other suitable means. The amount of amino compound employed for this reaction should be sufficient to react with all the halogen atoms in the halogenoalkylhalogenosilane (1). It is usually desirable that the reaction be conducted using an excess of the amino compound since this permits easier separation of the pure product, because the amino compound acts as a hydrogen halide acceptor. If desired, inert hydrogen halide acceptors such as tributylamine, pyridine and quinoline can be substituted in place of some of the excess amino compound intended as a hydrogen halide acceptor. It is preferable to use between 7 and 10 mols of the amino compound (2) per mol of (1).

The cyclic silanes of this invention which contain no (XR'—)Y$_2$Si— groups can be prepared by heating a silane of the general formula (RNHR')Si(R'')$_a$(OZ)$_{3-a}$. R can be a hydrogen atom, monovalent hydrocarbon, monovalent hydrocarbon radical containing oxygen in the form of

linkages, aminoalkyl, aminophenyl or halogenophenyl radical. R' is as defined above. R'' is a monovalent hydrocarbon radical or a monovalent hydrocarbon radical containing oxygen in the form of

linkages. Z is a phenyl, alkyl or an alkyl radical containing oxygen in the form of

linkages. The subscript $a$ has a value of from 0 to 2 inclusive. One of the OZ groups is eliminated as an alcohol of the formula HOZ during the course of this reaction resulting in a product of the general formula

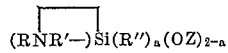

It is necessary that a temperature in excess of 100° C. be employed in this reaction. Generally, temperatures near the boiling point of the alkoxysilane are preferred. If desired, the alcohol produced during the reaction can be removed as the reaction proceeds. It was most unexpected that one OZ group would be cleaved and a cyclic formed upon heating (RNHR'—)Si(R'')$_a$(OZ)$_{3-a}$.

A method for making the cyclic silanes of this invention which contain a (XR'—)Y$_2$Si— group is to react a disilazane of the formula HN[Si(R'')$_2$(R'X)]$_2$ with ammonia. R'' is a monovalent hydrocarbon radical. X is a chlorine, bromine or iodine atom. R' is a divalent saturated aliphatic hydrocarbon radical attached to a carbon atom which is at least the third and not more than the sixth carbon atom away from the halogen atom attached to R'. Suitable examples of such XR'— groups are ClCH$_2$CH(CH$_3$)CH$_2$—, BrCH$_2$CH(CH$_3$)CH$_2$— and ICH$_2$CH(CH$_3$)CH$_2$—. This reaction produces two products. One product has the general formula

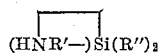

The other product has the formula

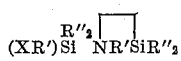

This reaction can be carried out at various temperatures. Generally, temperatures between 100° C. and 200° C. are preferred. The reaction can be conducted within a wide range of atmospheric and superatmospheric pressures. Superatmospheric pressures are preferred for faster and more complete reaction. The ammonium halide produced during this reaction is best separated by filtration.

The compound HN[Si(R'')$_2$(—R'X)]$_2$ is produced by effecting a reaction between ammonia and

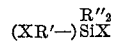

X is as defined above. This reaction is best carried out at a temperature below the boiling point of ammonia. The new compound HN[Si(R'')$_2$CH$_2$CH(CH$_3$)CH$_2$Cl]$_2$ was produced by this method. R'' is a monovalent hydrocarbon radical. This new disilazane is useful as an intermediate in the preparation of nitrogen-containing siloxanes.

The cyclic compounds of this invention which contain no alkoxy or phenoxy radicals can be hydrolyzed and condensed to produce disiloxanes. The cyclic compounds which contain either alkoxy or phenoxy radicals can be hydrolyzed and condensed to produce either linear or crosslinked siloxanes depending upon the number of alkoxy and/or phenoxy groups attached to each silicon atom. The siloxanes produced from the cyclic silanes of this invention have the unit formula

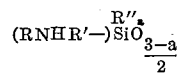

These siloxanes are made by hydrolyzing and condensing a compound of the general formula

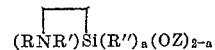

wherein R is selected from the group consisting of hydrogen atoms, monovalent hydrocarbon, monovalent hydrocarbon radicals containing oxygen in the form of

linkages, aminoalkyl, aminophenyl, halogenophenyl and organosilyl radicals of the formula (XR'—)Y$_2$Si— wherein Y is a monovalent hydrocarbon radical and X is selected from the group consisting of halogen atoms having an atomic weight of at least 35 and hydrogen atoms, R' is a divalent saturated aliphatic hydrocarbon radical wherein the silicon atom is attached to a carbon atom which is at least the third and not more than the sixth carbon atom away from the substituent attached to R', R'' is selected from the group consisting of monovalent hydrocarbon and monovalent hydrocarbon radicals containing oxygen in the form of

linkages, Z is selected from the group consisting of alkyl and phenyl radicals and alkyl radicals containing oxygen in the form of

linkages and $a$ has a value of from 0 to 2 inclusive.

These organosilicon polymers can be employed as a basis for rubbers, resins and oils. These nitrogen-containing siloxanes are useful as corrosion inhibitors in corrosive solutions that are in contact with steel. These nitrogen-containing siloxanes are useful as curing agents in polyurethane resins.

The cyclic silanes of this invention can be reacted with hydroxy endblocked diorganosiloxanes to produce a siloxane which is endblocked with units containing nitrogen attached to silicon through a divalent saturated aliphatic hydrocarbon radical. These endblocked diorganosiloxanes are produced by effecting a reaction between

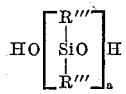

(1)

and

(2)

A product of the formula

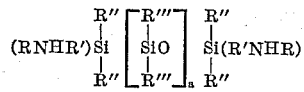

is obtained from this reaction. R is selected from the group consisting of hydrogen atoms, monovalent hydrocarbon, monovalent hydrocarbon radicals containing oxygen in the form of

linkages, aminoalkyl, aminophenyl, halogenophenyl and organosilyl radicals of the general formula $$(XR'-)Y_2Si-$$

wherein Y is a monovalent hydrocarbon radical and X is selected from the group consisting of halogen atoms having an atomic weight of at least 35 and hydrogen atoms, R' is a divalent saturated aliphatic hydrocarbon radical wherein the silicon atom is attached to a carbon atom which is at least the third and not more than the sixth carbon atom away from the other substituent attached to R', R" is a monovalent hydrocarbon radical, $a$ has a value of at least 1 and R''' is a monovalent hydrocarbon or a monovalent halogenated hydrocarbon radical, such as chloromethyl or 3,3,3-trifluoropropyl. These diorganosiloxanes can be used wherever conventional diorganosiloxanes are used. This method of endblocking diorganosiloxanes is preferable to equilibrating siloxanes because with this method only one species of siloxane is obtained.

The following examples are illustrative only and should not be construed as limiting the invention which is properly delineated in the appended claims.

EXAMPLE 1

3-chloro-2-methylpropyldimethylchlorosilane (556.5 g., 3 mols) and methylamine (640 g., 20.6 mols) were heated in a pressure vessel at 100° C. for 22 hours. The mass was then cooled and the layers separated. Distillation of the top layer gave a 76 percent yield of

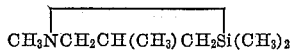

Into a flask containing 28.5 g. (0.2 mol) of the above product, there was added 1.8 g. (0.1 mol) of distilled water. A peak temperature of 98° C. was reached upon stirring the mass. Distillation at 2 mm. gave a 92 percent yield of

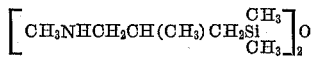

EXAMPLE 2

Quantitative yields of the following siloxanes were obtained by adding

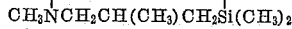

to the following diorganosilicon compounds at a ratio of 2 mols of the cyclic compound per one mol of the diorgansilicon compound. In each case the mixture was stirred after the addition. In each case approximate values for the degree of polymerization of the diorganosilicon compound and the siloxane product are given.

*Table 1*

| | Diorganosilicon compound | Siloxane product |
|---|---|---|
| 1 | $HO\underset{(C_6H_5)}{\underset{|}{\overset{(C_6H_5)}{\overset{|}{Si}}}}OH$ | $\left[CH_3NHCH_2CH(CH_3)CH_2\underset{CH_3}{\overset{CH_3}{\overset{|}{Si}}}O\right]_2 Si(C_6H_5)_2$ |
| 2 | $HO\left(\underset{CH_3}{\overset{CH_3}{\overset{|}{Si}}}O\right)_{325}H$ | $\left[CH_3NHCH_2CH(CH_3)CH_2\underset{CH_3}{\overset{CH_3}{\overset{|}{Si}}}O\right]\left[\underset{CH_3}{\overset{CH_3}{\overset{|}{Si}}}O\right]_{325}\left[\underset{CH_3}{\overset{CH_3}{\overset{|}{Si}}}CH_2CH(CH_3)CH_2NHCH_3\right]$ |
| 3 | $HO\left(\underset{CH_3}{\overset{CH_3}{\overset{|}{Si}}}O\right)_{100}H$ | $\left[CH_3NHCH_2CH(CH_3)CH_2\underset{CH_3}{\overset{CH_3}{\overset{|}{Si}}}O\right]\left[\underset{CH_3}{\overset{CH_3}{\overset{|}{Si}}}O\right]_{100}\left[\underset{CH_3}{\overset{CH_3}{\overset{|}{Si}}}CH_2CH(CH_3)CH_2NHCH_3\right]$ |
| 4 | $HO\left(\underset{CH_3}{\overset{CH_3}{\overset{|}{Si}}}O\right)_{8.2}H$ | $\left[CH_3NHCH_2CH(CH_3)CH_2\underset{CH_3}{\overset{CH_3}{\overset{|}{Si}}}O\right]\left[\underset{CH_3}{\overset{CH_3}{\overset{|}{Si}}}O\right]_{8.2}\left[\underset{CH_3}{\overset{CH_3}{\overset{|}{Si}}}CH_2CH(CH_3)CH_2NHCH_3\right]$ |

EXAMPLE 3

3-chloro-2-methylpropyldimethylchlorosilane (371 g., 2 mols) and ethylenediamine (840 g., 14 mols) were refluxed together for 3 hours. The mass was then cooled and the layers separated. Distillation at 30 mm. pressure of the top layer gave a 75 percent yield of

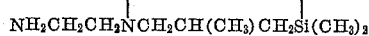

EXAMPLE 4

4-chlorobutyldimethylchlorosilane (115 g., 0.62 mol) and methylamine (317 g., 10.3 mols) were heated in a pressure vessel at 100° C. for 20 hours. The mass was then cooled and the layers separated. Distillation of the top layer gave a 35 percent yield of

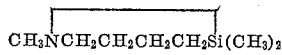

Into a flask containing 14.3 g. (0.1 mol) of the above product, there was added 0.9 g. (0.05 mol) of distilled water. A temperature rise occurred upon stirring the mass. A quantitative yield of

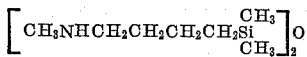

was obtained.

EXAMPLE 5

3-chloro-2-methylpropylphenylmethylchlorosilane (248 g., 1 mol) and methylamine (186 g., 6 mols) were heated in a pressure vessel at 100° C. for 13 hours. The mass was then cooled and the two layers separated. Distillation of the product layer at 15 mm. pressure gave a 65 percent yield of

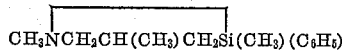

EXAMPLE 6

3- chloropropyldimethylchlorosilane (342 g., 2 mols) and aniline (302 g., 14 mols) were heated in a flask for 3 hours at 100° C. The mass was then cooled and the aniline hydrochloride was partially separated by using triethylamine and toluene. Distillation at 15 mm. pressure gave a 21 percent yield of

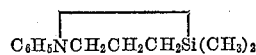

EXAMPLE 7

An excess of ammonia was bubbled through 3-chloro-2-methylpropyldimethylchlorosilane (741 g., 4 mols) in pentane. The resulting $NH_4Cl$ was removed by filtration and the pentane was stripped from the product. 552 g. (1.76 mols) of

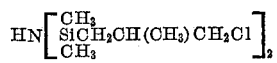

were obtained.

The above product and 620 g. (37 mols) of ammonia were heated in a pressure vessel at 100° C. for 46 hours. The mass was then cooled and the $NH_4Cl$ separated by filtration. Distillation of the remaining liquid produced an 18 percent yield of

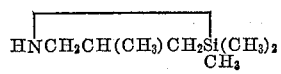

and a 58 percent yield of

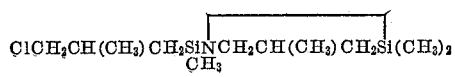

EXAMPLE 8

The alkoxysilane,

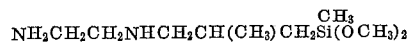

was heated to its atmospheric boiling point and the methanol removed. Vacuum distillation of the remaining portion gave

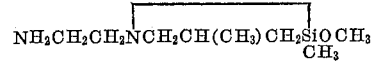

in a 68 percent yield.

Using the above procedure, the cyclic silane,

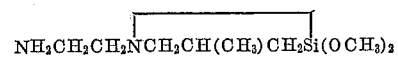

was produced from

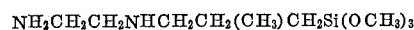

EXAMPLE 9

The following cyclic silanes are produced when the following halogenoalkylhalogenosilanes and amino compounds are reacted in accordance with the procedure of Example 1. The following siloxanes are obtained when these cyclic silanes are hydrolyzed in accordance with the procedure of Example 1.

*Table II*

| Reactants | | Products | |
|---|---|---|---|
| Halogenoalkylenehalogenosilane | Amino Compound | Cyclic Silane | Siloxane |
| 1. $ClCH_2CH(CH_3)CH_2SiCl(C_2H_5)_2$ | $CH_3CH_2CH_2NH_2$ | $CH_3CH_2CH_2NCH_2CH(CH_3)CH_2Si(C_2H_5)_2$ | $[CH_3CH_2CH_2NHCH_2CH(CH_3)CH_2Si(C_2H_5)_2]_2O$ |
| 2. $BrCH_2(CH_2)_3CH_2SiBr(CH=CH_2)(CH_3)$ | $CH_2=CHCH_2NH_2$ | $CH_2=CHCH_2NCH_2(CH_2)_3CH_2Si(CH_3)(CH=CH_2)$ | $[CH_2=CHCH_2NHCH_2(CH_2)_3CH_2Si(CH=CH_2)(CH_3)]_2O$ |
| 3. $ICH_2(CH_2)_4CH_2SiI(C_6H_{11})(CH_3)$ | $C_6H_{11}NH_2$ | $C_6H_{11}NCH_2(CH_2)_4CH_2Si(C_6H_{11})(CH_3)$ | $[C_6H_{11}NHCH_2(CH_2)_4CH_2Si(C_6H_{11})(CH_3)]_2O$ |
| 4. $ClCH_2CH(CH_2CH_3)CH_2CH_2Si(CH_2C_6H_5)(CH_3)$ | $NH_2CH_2(CH_2)_4CH_2NH_2$ | $NH_2CH_2(CH_2)_4CH_2NCH_2CH(CH_2CH_3)CH_2CH_2Si(CH_2C_6H_5)(CH_3)$ | $[NH_2CH_2(CH_2)_4CH_2NHCH_2CH(CH_2CH_3)CH_2CH_2Si(CH_2C_6H_5)(CH_3)]_2O$ |
| 5. $ClCH_2CH[(CH_2)_2CH_3]CH_2SiCl(C_3H_7)(CH_3)$ | $NH_2C_6H_4NH_2$ | $NH_2C_6H_4NCH_2CH[(CH_2)_2CH_3]CH_2Si(C_3H_7)(CH_3)$ | $[NH_2C_6H_4NHCH_2CH(CH_2CH_2CH_3)CH_2Si(C_3H_7)(CH_3)]_2O$ |
| 6. $ClCH_2CH(CH_3)CH_2SiCl(OCH_3)(CH_3)$ | $CH_3NH_2$ | $CH_3NCH_2CH(CH_3)CH_2Si(OCH_3)(CH_3)$ | $(CH_3)[CH_3NHCH_2CH(CH_3)CH_2]SiO$ |
| 7. $ClCH_2CH(CH_3)CH_2SiCl(CH_3)_2$ | $p\text{-}ClC_6H_4NH_2$ | $ClC_6H_4NCH_2CH(CH_3)CH_2Si(CH_3)_2$ | $[ClC_6H_4NHCH_2CH(CH_3)CH_2Si(CH_3)_2]_2O$ |
| 8. $ClCH_2CH_2CH_2SiCl(CH_3)_2$ | $CH_3OCH_2CH_2NH_2$ | $CH_3OCH_2CH_2NCH_2CH_2CH_2Si(CH_3)_2$ | $[CH_3OCH_2CH_2NHCH_2CH_2CH_2Si(CH_3)_2]_2O$ |

Table II—Continued

| Reactants | | Products | |
|---|---|---|---|
| Halogenoalkylenehalogenosilane | Amino Compound | Cyclic Silane | Siloxane |
| 9. ClCH$_2$CH$_2$CH$_2$SiCl(CH$_2$CH$_2$OCH$_3$)(CH$_3$) | CH$_3$NH$_2$ | ⌐CH$_3$NCH$_2$CH$_2$CH$_2$Si(CH$_3$)(CH$_2$CH$_2$OCH$_3$)⌐ | [CH$_3$NHCH$_2$CH$_2$CH$_2$Si(CH$_3$)(CH$_2$CH$_2$OCH$_3$)]O |
| 10. ClCH$_2$CH$_2$CH$_2$SiCl(OCH$_2$CH$_2$OCH$_3$)(CH$_3$) | CH$_3$NH$_2$ | ⌐CH$_3$NCH$_2$CH$_2$CH$_2$Si(CH$_3$)(OCH$_2$CH$_2$OCH$_3$)⌐ | CH$_3$NHCH$_2$CH$_2$CH$_2$SiO(CH$_3$) |
| 11. ClCH$_2$CH$_2$CH$_2$SiCl(OCH$_2$OCH$_2$CH$_3$)$_2$ | CH$_3$NH$_2$ | ⌐CH$_3$NCH$_2$CH$_2$CH$_2$Si(OCH$_2$OCH$_2$CH$_3$)$_2$⌐ | (CH$_3$NHCH$_2$CH$_2$CH$_2$)SiO$_{1.5}$ |

EXAMPLE 10

When the following halogenoalkylhalogenosilanes are reacted with ammonia in accordance with the procedure of Example 7, the following disilazanes are obtained. When these disilazanes are reacted with ammonia in accordance with the procedure of Example 7, the following cyclic silanes are obtained. The following siloxanes are obtained when these cyclics are hydrolyzed in accordance with the procedure of Example 1.

Table III

| Halogenoalkylhalogeno-silanes | Products | | |
|---|---|---|---|
| | Disilazanes | Cyclics | Siloxane |
| 1. ClCH$_2$CH$_2$CH$_2$SiCl(CH$_3$)(C$_6$H$_5$) | HN[SiCH$_2$CH$_2$CH$_2$Cl(CH$_3$)(C$_6$H$_5$)]$_2$ | A. ⌐HNCH$_2$CH$_2$CH$_2$Si(CH$_3$)(C$_6$H$_5$)⌐ <br> B. ⌐ClCH$_2$CH$_2$CH$_2$Si(C$_6$H$_5$)—NCH$_2$CH$_2$CH$_2$Si(CH$_3$)(C$_6$H$_5$)⌐ (CH$_3$) | A. [H$_2$NCH$_2$CH$_2$CH$_2$Si(CH$_3$)(C$_6$H$_5$)]$_2$O <br> B. [ClCH$_2$CH$_2$CH$_2$Si(CH$_3$)(C$_6$H$_5$)NHCH$_2$CH$_2$CH$_2$Si(CH$_3$)(C$_6$H$_5$)]$_2$O |
| 2. Br(CH$_2$)$_6$SiBr(CH=CH$_2$)(CH$_3$) | HN[Si(CH$_2$)$_6$Br(CH=CH$_2$)(CH$_3$)]$_2$ | A. ⌐HN(CH$_2$)$_6$Si(CH=CH$_2$)(CH$_3$)⌐ <br> B. ⌐Br(CH$_2$)$_6$Si(CH=CH$_2$)(CH$_3$)—N(CH$_2$)$_6$Si(CH=CH$_2$)(CH$_3$)⌐ | A. [H$_2$N(CH$_2$)$_6$Si(CH=CH$_2$)(CH$_3$)]$_2$O <br> B. [Br(CH$_2$)$_6$Si(CH=CH$_2$)(CH$_3$)NH(CH$_2$)$_6$Si(CH=CH$_2$)(CH$_3$)]$_2$O |

EXAMPLE 11

The following cyclic alkoxysilanes are obtained when the following alkoxysilanes are heated in accordance with the procedure of Example 8. The following siloxanes are obtained when these cyclic alkoxysilanes are hydrolyzed in accordance with the procedure of Example 1.

Table IV

| Alkoxysilanes | Products | |
|---|---|---|
| | Cyclic alkoxysilanes | Unit Formula of Siloxanes |
| NH$_2$(CH$_2$)$_4$NH(CH$_2$)$_6$Si(OC$_3$H$_7$)$_2$(C$_6$H$_5$) | ⌐NH$_2$(CH$_2$)$_4$N(CH$_2$)$_6$Si(OC$_3$H$_7$)(C$_6$H$_5$)⌐ | NH$_2$(CH$_2$)$_4$NH(CH$_2$)$_6$SiO(C$_6$H$_5$) |
| H$_2$N(CH$_2$)$_4$Si(OC$_6$H$_5$)$_2$(CH=CH$_2$) | ⌐HN(CH$_2$)$_4$Si(OC$_6$H$_5$)(CH=CH$_2$)⌐ | H$_2$N(CH$_2$)$_4$SiO(CH=CH$_2$) |
| H$_2$NC$_6$H$_4$NHCH$_2$CH(CH$_3$)CH$_2$Si(OC$_6$H$_{11}$)$_2$(C$_6$H$_{11}$) | ⌐NH$_2$C$_6$H$_4$NCH$_2$CH(CH$_3$)CH$_2$Si(OC$_6$H$_{11}$)(C$_6$H$_{11}$)⌐ | NH$_2$C$_6$H$_4$NHCH$_2$CH(CH$_3$)CH$_2$SiO(C$_6$H$_{11}$) |
| CH$_3$CH$_2$NH(CH$_2$)$_3$Si(OC$_2$H$_5$)$_3$ | ⌐CH$_3$CH$_2$N(CH$_2$)$_3$Si(OC$_2$H$_5$)$_2$⌐ | CH$_3$CH$_2$NH(CH$_2$)$_3$SiO$_{1.5}$ |

Table IV—Continued

| Alkoxysilanes | Products | |
|---|---|---|
| | Cyclic alkoxysilanes | Unit Formula of Siloxanes |
| C₆H₅NHCH₂CH(CH₃)CH₂Si(OC₆H₅)₃ | C₆H₅ṄCH₂CH(CH₃)CH₂S̄i(OC₆H₅)₂ | C₆H₅NHCH₂CH₂(CH₃)CH₂SiO₁.₅ |
| H₂N(CH₂)₃Si(OCH₃)(CH₃)₂ | HṄ(CH₂)₃S̄i(CH₃)₂ | [H₂N(CH₂)₃Si(CH₃)(CH₃)]₂O |
| CH₃NH(CH₂)₃Si(OCH₃)(OCH₂CH₂OCH₃)₂ | CH₃Ṅ(CH₂)₃S̄i(CH₃)(OCH₂CH₂OCH₃) | [CH₃NH(CH₂)₃]SiO(CH₃) |
| CH₃NH(CH₂)₃Si(OCH₂OCH₂CH₃)₃ | CH₃Ṅ(CH₂)₃S̄i(OCH₂OCH₂CH₃)₂ | [CH₃NH(CH₂)₃]SiO₁.₅ |

EXAMPLE 12

The following siloxanes are obtained when the following cyclic silanes are reacted with the following hydroxy-endblocked siloxanes in accordance with the procedure of Example 2.

linkages, alkoxy, alkoxy radicals containing oxygen in the form of $$-\overset{|}{\underset{|}{C}}-O-\overset{|}{\underset{|}{C}}-$$

linkages and phenoxy radicals.

Table V

| Reactants | | Unit Formula of Siloxane Product |
|---|---|---|
| Siloxane | Cyclicsilane | |
| HO(SiO(CH₂CH₂CF₃)(CH₃))₁₀₀H | ClCH₂CH(CH₃)CH₂S̄i(CH₃)(CH₃) | ClCH₂CH(CH₃)CH₂SiNHCH₂CH(CH₃)CH₂SiO(CH₃)(CH₃)(SiO(CH₂CH₂CF₃)(CH₃))₁₀₀ SiOCH₂CH(CH₃)CH₂NHSiCH₂CH(CH₃)CH₂Cl(CH₃)(CH₃) |
| | ṄCH₂CH(CH₃)CH₂S̄i(CH₃)₂ | |
| HO(SiO(C₃H₇)(CH₃))₄₀₀H | NH₂CH₂CH₂Ṅ(CH₂)₃S̄i(C₆H₅)(CH₃) | NH CH₂CH₂NH(CH₂)₃SiO(C₆H₅)(CH₃)(SiO(C₃H₇)(CH₃))₄₀₀ Si(CH₂)₃NHCH₂CH₂NH₂(C₆H₅)(CH₃) |
| HO(SiO(CH=CH₂)(CH₃))₂₅₀H | NH₂C₆H₄Ṅ(CH₂)₆S̄i(CH=CH₂)CH₃ | NH₂C₆H₄NH(CH₂)₆SiO(CH=CH₂)(CH₃)(SiO(CH=CH₂)(CH₃))₂₅₀ Si(CH₂)₆NHC₆H₄NH₂(CH=CH₂)(CH₃) |

That which is claimed is:

1. An organosilicon compound of the general formula $$(R\overline{NR'-)SiR''_2}$$

wherein R is selected from the group consisting of hydrogen atoms, monovalent hydrocarbon, monovalent hydrocarbon radicals containing oxygen in the form of $$-\overset{|}{\underset{|}{C}}-O-\overset{|}{\underset{|}{C}}-$$

linkages, aminoalkyl, aminophenyl, halogenophenyl and organosilyl radicals of the general formula $$(XR'-)Y_2Si-$$

wherein Y is a monovalent hydrocarbon radical and X is selected from the group consisting of halogen atoms having an atomic weight of at least 35 and hydrogen atoms, R' is a divalent saturated aliphatic hydrocarbon radical wherein the silicon atom is attached to a carbon atom which is at least the third and not more than the sixth carbon atom away from the other substituent attached to R', and R'' is selected from the group consisting of monovalent hydrocarbon, monovalent hydrocarbon radicals containing oxygen in the form of $$-\overset{|}{\underset{|}{C}}-O-\overset{|}{\underset{|}{C}}-$$

2. The organosilicon compound of claim 1, wherein R is a monovalent hydrocarbon radical, R' is a divalent saturated aliphatic hydrocarbon radical wherein the nitrogen atom is attached to a carbon atom which is the third carbon atom away from the silicon atom and R'' is a monovalent hydrocarbon radical.

3. An organosilicon compound of the formula $$CH_3\overline{NCH_2CH(CH_3)CH_2Si}(CH_3)_2$$

4. An organosilicon compound of the formula $$CH_3\overline{NCH_2CH_2CH_2CH_2Si}(CH_3)_2$$

5. An organosilicon compound of the formula $$C_6H_5\overline{NCH_2CH_2CH_2Si}(CH_3)_2$$

6. An organosilicon compound of the formula $$CH_3\overline{NCH_2CH(CH_3)CH_2Si}(CH_3)(C_6H_5)$$

7. A method for making an organosilicon compound which comprises reacting (1)

$$(XR')SiX^{R''_2}$$

and (2) RNH$_2$, wherein R is selected from the group consisting of monovalent hydrocarbon, monovalent hydrocarbon radicals containing oxygen in the form of

linkages, aminoalkyl, aminophenyl and halogenophenyl radicals, R' is a divalent saturated aliphatic hydrocarbon radical wherein the silicon atom is attached to a carbon atom which is at least the third and not more than the sixth carbon atom away from the other substituent attached to R', and R" is selected from the group consisting of monovalent hydrocarbon, monovalent hydrocarbon radicals containing oxygen in the form of

linkages, alkoxy and phenoxy radicals and alkoxy radicals containing oxygen in the form of

linkages and X is a halogen atom selected from the group consisting of chlorine, bromine and iodine, whereby an organosilicon compound of the formula

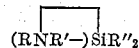

is obtained.

8. A method for making the organosilicon compound of claim 2 which comprising reacting (1)

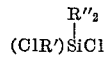

wherein R' is a divalent saturated aliphatic hydrocarbon radical wherein the nitrogen atom is attached to a carbon atom which is the third carbon away from the silicon atom and R" is a monovalent hydrocarbon radical, and (2) RNH$_2$, wherein R is a monovalent hydrocarbon radical, whereby the organosilicon compound of claim 2 is obtained.

9. A method for making the organosilicon compound of claim 3 which comprises reacting (1)

[ClCH$_2$CH(CH$_3$)CH$_2$]Si(CH$_3$)$_2$Cl and (2) CH$_3$NH$_2$, whereby the organosilicon compound of claim 3 is obtained.

10. A method for making an organosilicon compound of the general formula

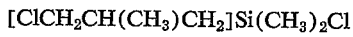

which comprises heating at a temperature in excess of 100° C. a compound of the general formula (RNHR')Si(R")$_a$(OZ)$_{3-a}$ wherein R is selected from the group consisting of hydrogen atoms, monovalent hydrocarbon, monovalent hydrocarbon radicals containing oxygen in the form of

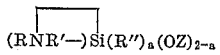

linkages, aminoalkyl, aminophenyl and halogenophenyl radicals, R' is a divalent saturated aliphatic hydrocarbon radical wherein the nitrogen atom is attached to a carbon atom which is at least the third and not more than the sixth carbon atom away from the silicon atom and R" is selected from the group consisting of monovalent hydrocarbon radicals and monovalent hydrocarbon radicals containing oxygen in the form of

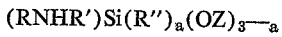

linkages and Z is selected from the group consisting of phenyl and alkyl radicals and alkyl radicals containing oxygen in the form of

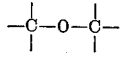

linkages and $a$ has a value of from 0 to 2 inclusive.

11. The method of claim 10 wherein R is a monovalent hydrocarbon radical, R' is a divalent saturated aliphatic hydrocarbon radical wherein the nitrogen atom is attached to a carbon atom which is the third carbon atom away from the silicon atom and R" and Z are alkyl radicals.

12. The method of claim 10 wherein R is an alkyl radical of from 1 to 6 inclusive carbon atoms, R' is a —CH$_2$CH(CH$_3$)CH$_2$— radical and R" and Z are methyl.

13. A method for making a siloxane of the unit formula

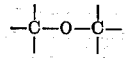

which comprises hydrolyzing and condensing a compound of the general formula

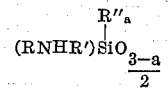

wherein R is selected from the group consisting of hydrogen atoms, monovalent hydrocarbon, monovalent hydrocarbon radicals containing oxygen in the form of

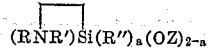

linkages, aminoalkyl, aminophenyl, halogenophenyl and organosilyl radicals of the formula (XR'—)Y$_2$Si— wherein Y is a monovalent hydrocarbon radical and X is selected from the group consisting of halogen atoms having an atomic weight of at least 35 and hydrogen atoms, R' is a divalent saturated aliphatic hydrocarbon radical wherein the silicon atom is attached to a carbon atom which is a least third and not more than the sixth carbon atom away from the other substituent attached to R', R" is selected from the group consisting of monovalent hydrocarbon and monovalent hydrocarbon radicals containing oxygen in the form of

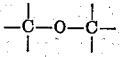

linkages, Z is selected from the group consisting of alkyl and phenyl radicals and alkyl radicals containing oxygen in the form of

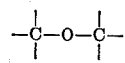

linkages and $a$ has a value of from 0 to 2 inclusive.

14. The method of claim 13 wherein R is a monovalent hydrocarbon radical, R' is a divalent saturated aliphatic hydrocarbon radical wherein the nitrogen atom is attached to a carbon atom which is the third carbon atom away from the silicon atom, R" is a monovalent hydrocarbon radical and Z is an alkyl radical.

15. The method of claim 13 wherein R is an alkyl radical of from 1 to 6 inclusive carbon atoms, R' is a —CH$_2$CH(CH$_3$)CH$_2$— radical, R" is an alkyl radical of from 1 to 6 inclusive carbon atoms and Z is methyl.

16. A method for making an organosilicon compound which comprises reacting (1)

wherein R is selected from the group consisting of hydrogen atoms, monovalent hydrocarbon, monovalent hydrocarbon radicals containing oxygen in the form of

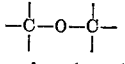

linkages, aminoalkyl, aminophenyl, halogenophenyl and organosilyl radicals of the general formula (XR'—)Y$_2$Si— wherein Y is a monovalent hydrocarbon radical and X is selected from the group consisting of halogen atoms having an atomic weight of at least 35 and hydrogen atoms, R' is a divalent saturated aliphatic hydrocarbon radical wherein the silicon atom is attached to a carbon atom which is at least the third and not more than the sixth carbon atom away from the other substituent attached to R', and R'' is a monovalent hydrocarbon, and (2)

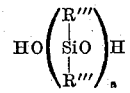

wherein R''' is selected from the group consisting of monovalent hydrocarbon and monovalent halogenated hydrocarbon radicals and $a$ has a value of at least 1, whereby there is obtained an organosilicon compound of the formula

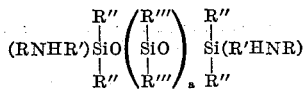

wherein R, R', R'', R''' and $a$ are as above defined.

17. A method for making an organosilicon compound which comprises reacting (1)

wherein R is a monovalent hydrocarbon radical, R' is a divalent saturated aliphatic hydrocarbon radical wherein the nitrogen atom is attached to a carbon atom which is the third carbon atom away from the silicon atom and R'' is an alkyl radical, with (2)

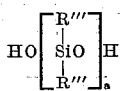

wherein R''' is a monovalent hydrocarbon radical and $a$ has a value of at least 1, whereby there is obtained an organosilicon compound of the formula

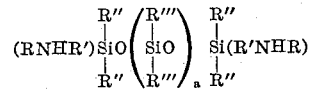

wherein R. R'. R''. R''' and $a$ are as above defined.

18. An organosilicon compound of the general formula $HN[Si(R'')_2CH_2CH(CH_3)CH_2Cl]_2$ wherein R'' is a monovalent hydrocarbon radical.

19. An organosilicon compound of the formula $$HN[Si(CH_3)_2CH_2CH(CH_3)CH_2Cl]_2$$

References Cited in the file of this patent

UNITED STATES PATENTS

| | | |
|---|---|---|
| 2,762,823 | Speier | Sept. 11, 1956 |
| 2,947,771 | Bailey | Aug. 2, 1960 |
| 2,972,598 | Morehouse | Feb. 21, 1961 |

OTHER REFERENCES

Sommer et al.: "Jour. Am. Chem. Soc.," vol. 70, 1948, pages 2869–72.

Petrov et al.: "Izvest. Akad. Nauk, SSSR," 1960, pages 143–5 (54, Chem. Abstracts, 20, 846).

UNITED STATES PATENT OFFICE
CERTIFICATE OF CORRECTION

Patent No. 3,146,250                                  August 25, 1964

John L. Speier

It is hereby certified that error appears in the above numbered patent requiring correction and that the said Letters Patent should read as corrected below.

Column 1, lines 21 to 23, the formula should appear as shown below instead of as in the patent:

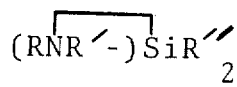

column 3, line 18, the formula should appear as shown below instead of as in the patent:

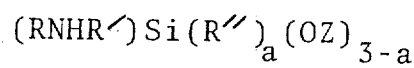

line 49, the formula should appear as shown below instead of as in the patent:

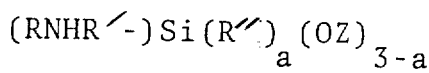

line 59, for "$ClCH_2CH(CH_s)CH_2-$" read -- $ClCH_2CH(CH_3)CH_2-$ --; columns 5 and 6, Table I, under the heading "Siloxane product" formula No. 2 should appear as shown below instead of as in the patent:

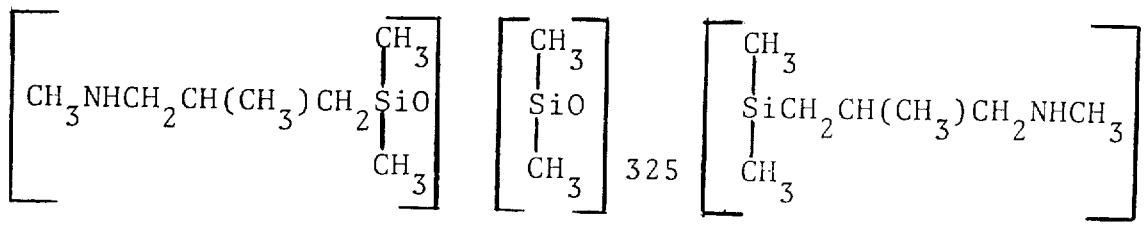

3,146,250 columns 9 and 10, Table III, under the heading "Siloxane", formula No. 2 A. should appear as shown below instead of as in the patent:

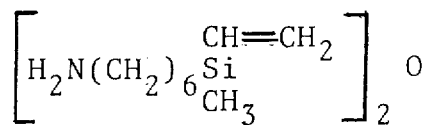

same columns, Table IV, under the heading "Alkoxysilanes", the third formula should appear as shown below instead of as in the patent:

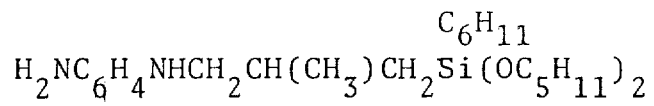

columns 11 and 12, Table V, under the heading "Unit Formula of Siloxane Product", the second formula should appear as shown below instead of as in the patent:

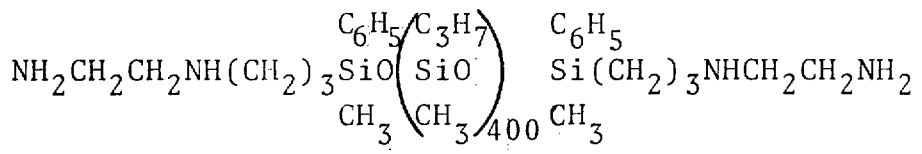

Signed and sealed this 15th day of June 1965.

(SEAL)
Attest:

ERNEST W. SWIDER
Attesting Officer

EDWARD J. BRENNER
Commissioner of Patents